(12) United States Patent
Yamada

(10) Patent No.: US 7,374,717 B2
(45) Date of Patent: May 20, 2008

(54) METHOD FOR PRODUCING INTERMETALLIC COMPOUND POROUS MATERIAL

(75) Inventor: Osamu Yamada, 27-1, Higashikanmaki 3-chome, Takatsuki-shi, Osaka-fu (JP)

(73) Assignees: Osamu Yamada, Osaka-Fu (JP); Osu Corporation, Osaka-Fu (JP)

( * ) Notice: Subject to any disclaimer, the term of this patent is extended or adjusted under 35 U.S.C. 154(b) by 0 days.

(21) Appl. No.: 11/084,896

(22) Filed: Mar. 21, 2005

(65) Prior Publication Data

US 2005/0207929 A1    Sep. 22, 2005

(30) Foreign Application Priority Data

Mar. 22, 2004 (JP) .............................. 2004-081821

(51) Int. Cl.
 *B22F 3/23* (2006.01)
(52) U.S. Cl. ............................... 419/2; 419/45; 419/46
(58) Field of Classification Search .................... 419/2, 419/45, 46
See application file for complete search history.

(56) References Cited

U.S. PATENT DOCUMENTS

| | | | | |
|---|---|---|---|---|
| 4,762,558 A | * | 8/1988 | German et al. ............... | 419/45 |
| 2004/0020176 A1 | * | 2/2004 | Kong ........................ | 55/282.3 |
| 2004/0043241 A1 | * | 3/2004 | Song et al. ................. | 428/547 |

FOREIGN PATENT DOCUMENTS

| | | |
|---|---|---|
| JP | 64 (1989)-17805 A | 1/1989 |
| JP | 04(1992)-235271 A | 8/1992 |
| JP | 10(1998)-81924 A | 3/1998 |
| JP | 11(1999)-130405 A | 5/1999 |
| JP | 11-233245 | 8/1999 |
| JP | 2002-97531 A | 4/2002 |
| JP | 2002-305074 | 10/2002 |
| JP | 2002-313546 | 10/2002 |
| JP | 2003-55063 | 2/2003 |
| JP | 2003-100427 | 4/2003 |
| WO | WO 2004/002881 A1 | 1/2004 |

OTHER PUBLICATIONS

Osamu Yamada, "Combustion Synthesis of Intermetallic Compounds and Applications", College of General Education, Osaka Sangyo University, Published May 20, 2001, pp. 95-103.
Japanese Office Action dated Jun. 5, 2007.

* cited by examiner

*Primary Examiner*—Roy King
*Assistant Examiner*—Ngoclan T. Mai
(74) *Attorney, Agent, or Firm*—Knobbe Martens Olson & Bear LLP

(57) ABSTRACT

The present invention provides a method for efficiently producing an intermetallic compound porous material. Specifically, the invention provides a porous material production method comprising molding a mixed powder of at least two inorganic powders and performing a combustion synthesis reaction of the resulting molded mixed powder; wherein (1) the porous material contains an intermetallic compound, (2) the intermetallic compound has a three-dimensional network skeletal structure, and (3) the porous material has a relative density of not more than about 80%.

3 Claims, 2 Drawing Sheets

METHOD FOR PRODUCING INTERMETALLIC COMPOUND POROUS MATERIAL

TECHNICAL FIELD

The present invention relates to a porous material comprising an intermetallic compound, and to a production method thereof.

BACKGROUND ART

Heat-resistant alloys for turbine blades, etc., are cermets formed by dispersing an intermetallic compound in a matrix metal. Very few materials composed of an intermetallic compound alone are in practical use.

Intermetallic compounds are known to have excellent properties in terms of heat resistance, corrosion resistance, chemical resistance, etc. However, the synthesis of an intermetallic compound needs prolonged external heating, which is disadvantageous especially in view of production costs.

Furthermore, although intermetallic compounds are being developed for various uses, and the demand for intermetallic compound porous materials is growing, no technology has yet been developed to provide such materials efficiently.

DISCLOSURE OF THE INVENTION

A principal object of the present invention is to provide an efficient and reliable method for producing a porous material comprising an intermetallic compound.

In view of the problems of the prior art, the present inventor conducted extensive research and found that the above object can be achieved by a specific method of producing intermetallic compounds. Based on this finding, the inventor has accomplished the present invention.

The present invention provides a porous material and a production method thereof as follows:

1. A porous material comprising an intermetallic compound, the intermetallic compound comprising aluminum in combination with at least one member selected from the group consisting of iron, cobalt, nickel, ruthenium, rhodium, palladium, osmium, iridium, and platinum; wherein
   (1) the intermetallic compound has a three-dimensional network skeletal structure, and
   (2) the porous material has a relative density of not more than about 80%.
2. A porous material according to item 1, wherein an oxide layer is formed on all or part of the surface of the porous material.
3. A porous material according to item 2, wherein the oxide layer comprises a constituent element of the intermetallic compound.
4. A porous material according to any one of items 1 to 3, wherein the porous material has a relative density of 30% to 70%.
5. A porous material according to any one of items 1 to 4, wherein the porous material comprises 80% or more by weight of intermetallic compound.
6. A method for producing a porous material, comprising molding a mixed powder that comprises at least two inorganic powders and performing a combustion synthesis reaction on the resulting molded mixed powder; wherein
   (1) the porous material comprise an intermetallic compound,
   (2) the intermetallic compound has a three-dimensional network skeletal structure, and
   (3) the porous material has a relative density of not more than about 80%.
7. A production method according to item 6, wherein the mixed powder comprises an aluminum powder in combination with an inorganic powder comprising at least one member selected from the group consisting of iron, cobalt, nickel, ruthenium, rhodium, palladium, osmium, iridium, and platinum.
8. A production method according to item 6 or 7, wherein the mixed powder further comprises a powder comprising at least one member selected from the group consisting of metals, intermetallic compounds, and ceramics (other than the above inorganic powder and aluminum powder).
9. A production method according to any one of items 6 to 8, wherein before the combustion synthesis reaction, the surface of the molded mixed powder is provided with at least one member selected from the group consisting of metals, intermetallic compounds, and ceramics.
10. A porous material obtained by a production method according to any one of items 6 to 9.
11. A heater comprising a porous material according to any one of items 1 to 5.
12. A heater for high-frequency induction heating comprising a porous material according to any one of items 1 to 5.
13. A method for producing a hydrogen-containing gas, comprising bringing a heater according to item 11 or 12 into contact with steam to generate a hydrogen-containing gas.

The present invention is described below in detail.

1. Porous material

The porous material of the present invention comprises an intermetallic compound comprising aluminum in combination with at least one member selected from the group consisting of iron, cobalt, nickel, ruthenium, rhodium, palladium, osmium, iridium, and platinum; wherein (1) the intermetallic compound has a three-dimensional network skeletal structure, and (2) the porous material has a relative density of not more than about 80%.

The intermetallic compound in the invention is not limited as long as it is formed by the combination of components mentioned above; it encompasses known intermetallic compounds. Examples of intermetallic compounds include Ni—Al, Ir—Al, Co—Al, Pt—Al, etc. Of these, Ni—Al, Ir—Al, etc., are especially preferable.

The relative density of the porous material of the invention may be suitably set, usually within the limit of not more than 80%, depending on its use, purpose, etc. The relative density thereof is preferably 30% to 70%, more preferably 30% to 60%, and most preferably 30% to 55%.

Preferably, the porous material of the invention has an oxide layer formed on all or part of the surface of the skeletal structure. The capability of producing a porous material with such a unique structure can be increased especially by the later-described production method of the present invention. This unique structure contributes to excellent properties in terms of heat resistance, chemical resistance, etc. The porous material of the invention, therefore, can be suitably used for heaters and the like.

The oxide layer contains a constituent element of the intermetallic compound. For example, when the intermetallic compound having the above-mentioned skeletal structure is Ni—Al, the resulting oxide layer generally consists of aluminum oxide. The thickness of the oxide, which is not limited, is generally about 1 to about 100 μm.

Although the content of intermetallic compound in the porous material of the invention varies according to its use, the kind of intermetallic compound, etc., it is usually 80% or more by weight, and preferably 90% to 100% by weight.

2. Method for producing porous material

The porous material production method of the present invention comprises molding a mixed powder that comprises at least two inorganic powders and performing a combustion synthesis reaction on the resulting molded mixed powder; wherein (1) the porous material comprises an intermetallic compound, (2) the intermetallic compound has a three-imensional network skeletal structure, and (3) the porous material has a relative density of not more than about 80%.

The mixed powder in the invention comprises at least two inorganic powders, the combination of which is not limited as long as it promotes combustion synthesis reaction. The kinds of inorganic powders are not restricted, and suitable inorganic powders may be selected according to the intended product, use, desired properties, etc. Examples of inorganic powders include powders of metals, metal oxides, metal carbides, metal nitrides, metal salts (nitrates, chlorides, sulfates, carbonates, acetates, oxalates, etc.), metal hydroxides, etc.

Such inorganic powders and mixed powders are not limited with respect to their average particle diameter as long as they can be molded. The diameter thereof is usually in the range of about 0.1 to about 200 µm.

In particular, the mixed powder in the present invention preferably comprises an inorganic powder (inorganic powder A) of at least one member selected from the group consisting of Fe, Co, Ni, Ru, Rh, Pd, Os, Ir, and Pt, in combination with an inorganic powder (inorganic powder B) of Al.

The ratio between inorganic powder A and inorganic powder B may be suitably determined according to the kind of powders, use of final products, etc. The inorganic powder A/inorganic powder B ratio (molar ratio) is usually about 1/0.2-5, and preferably 1/0.3-3.

In the present invention, if necessary, other inorganic powder(s) (inorganic powder C) may be optionally used in combination with inorganic powders A and B. For example, the mixed powder preferably further contains an inorganic powder of at least one member selected from the group consisting of metals (elemental metals such as Ag, Cu, Sn, etc.), intermetallic compounds, oxide ceramics, boride ceramics, nitride ceramics, carbide ceramics, and silicide ceramics. Specific examples of optional inorganic powders include titanium oxide, zirconium oxide, hafnium oxide, boron oxide, silicon oxide, aluminum oxide, calcium oxide, magnesium oxide, titanium boride, zirconium boride, hafnium boride, titanium carbide, zirconium carbide, hafnium carbide, titanium silicide, zirconium silicide, hafnium silicide, etc. Such inorganic powders may be used singly or in combination of two or more.

The proportion of inorganic powder C may be suitably determined according to the kind of inorganic powder C, other inorganic powders, etc. The proportion of inorganic powder C is usually in the range of about 1% to about 50%, and preferably 10% to 20%, of the weight of the mixed powder.

In the present invention, a mixed powder containing such inorganic powders is molded to form a molded mixed powder. Molding may be conducted by known methods for molding ceramics. Examples thereof include press molding, slip casting, injection molding, isostatic molding, etc. Molding conditions such as molding pressure may be suitably determined according to the kind of inorganic powders, use of final products, etc. The molded mixed powder is not limited in shape and may be, for example, columnar, tubular (pipe-shaped), spherical, rectangular parallelepiped-shaped, tabular, etc.

In the present invention, before the combustion synthesis reaction, the surface of the molded mixed powder may be provided with at least one member selected from the group consisting of metals, intermetallic compounds, and ceramics. This allows the metals and/or intermetallic compounds and/or ceramics to melt and adhere to the surface of the molded mixed powder at the time of the combustion synthesis, resulting in a modified surface. Examples of metals, intermetallic compounds, and ceramics include titanium, zirconium, hafnium, calcium, magnesium, aluminum, chromium, vanadium, copper, silver, gold, platinum, iron, nickel, cobalt, nickel titanium, titanium aluminum, nickel aluminum, titania, silica, calcia, magnesia, alumina, chromia, hematite, titanium boride, zirconium boride, hafnium boride, titanium carbide, zirconium carbide, hafnium carbide, titanium silicide, zirconium silicide, hafnium silicide, etc. These may be provided by, for example, a method of applying a dispersion liquid or paste containing a powder of at least one of such metals, intermetallic compounds, and ceramics dispersed in a suitable solvent, or by a dipping method, spraying method, spin coating method, etc.

Subsequently, the molded mixed powder is subjected to a combustion synthesis reaction. The combustion synthesis reaction may be performed using ordinary combustion synthesis methods, operating conditions, etc. For example, the reaction can be initiated by locally heating the molded mixed powder by means of an electric discharge, laser irradiation, ignition using a carbon heater, etc. Once the reaction starts, it proceeds with spontaneous generation of heat, finally producing the intended porous material. The reaction time varies according to the size of the molded mixed powder, and is usually about several seconds to about several minutes.

The kinds of atmospheres in which the combustion synthesis reaction may be performed are broadly classified into two types: (1) atmospheric air (air) and other oxidizing atmospheres (method 1), and (2) inert gas atmospheres and vacuum (method 2).

In method 1, the atmosphere is usually atmospheric air (air) or another oxidizing atmosphere. The combustion synthesis reaction can be suitably performed, for example, in air at a pressure of 0.1 or more atmospheres (preferably 1 or more atmospheres).

In method 2, the atmosphere is usually a vacuum or an inert gas atmosphere. The combustion synthesis reaction can be carried out, for example, in an inert gas atmosphere using an inert gas such as argon, nitrogen, helium, etc.

Methods 1 and 2 each provide the intermetallic compound porous material of the present invention, which has a three-dimensional network structure. In particular, the pores (continuous holes) of the porous material are preferably through holes. Although the relative density of the porous material is not limited, it is preferably about 30% to about 70%. The relative density or the porosity of the porous material can be controlled by molded mixed powder density, combustion synthesis reaction temperature, atmosphere pressure, etc. Although the diameter of the above pores is not limited, it is usually several tens of microns. Pores of relatively uniform size are especially desirable.

Furthermore, method 1 provides a porous material with features 1 and 2 below. Specifically, a multilayer intermetallic compound porous material can be obtained having a surface oxide and an interior intermetallic compound.

(1) The intermetallic compound porous material has an oxide layer formed on all or part of the surface thereof. The thickness (depth) of the oxide layer is not limited, and may be suitably determined according to the use, purpose, size, etc., of the porous material. The thickness can be controlled by pressure adjustment, etc., of the above-mentioned atmosphere.

(2) The intermetallic compound is present in portions other than the oxide layer. In particular, it is preferable that the interior of the porous material be mainly composed of the intermetallic compound.

In contrast, method 2 provides an intermetallic compound porous material having no surface oxide. That is, the porous material obtained by method 1 is multilayered with layers of oxide and intermetallic compound, while the porous material of method 2 is substantially composed of a single layer of intermetallic compound. The porous material of method 2, however, may contain other components within limits such that the effects of the present invention are not impaired.

The present invention encompasses the intermetallic compound porous materials obtained by methods 1 and 2. As mentioned above, the composition and structure of the porous material of the invention can be suitably adjusted according to the kind of inorganic powder, etc. For example, when a mixed powder of nickel powder and aluminum powder, which are inorganic powders, is molded, and the molded mixed powder undergoes a combustion synthesis reaction in air or in another oxidizing atmosphere, then an intermetallic compound porous material can be obtained having an aluminum oxide (alumina) layer formed on the surface, with the interior of the material being composed of nickel aluminum.

The present invention also encompasses, for example, intermetallic compound porous materials having gradient structures, wherein the surface of a porous material is formed by an oxide layer, and the deeper into the interior one goes, the higher the proportion of intermetallic compound.

The porous material of the present invention can be used for the various uses to which conventional porous materials have been put. For example, it is suitable for use in heating elements (heating elements to decompose dioxin-containing harmful gases, heating elements to generate superheated steam, etc.), filters (diesel particulate filters, etc.), catalysts and catalyst supports, sensors, biomaterials (artificial bones, dental implants, artificial joints, etc.), antibacterial/antifouling materials, vaporizers, radiator plates and heat exchangers, electrode materials, semiconductor wafer suction plates, adsorbents, vent holes for outgassing, vibration-proof/soundproof materials, deoxidizers, etc.

Having excellent workability, the porous material of the invention can be worked into desirable shapes for the various uses mentioned above. Working can be conducted using known methods such as cutting and/or using known equipment.

3. Heater and method for producing hydrogen-containing gas

The porous material of the present invention is especially suitable for use as a heater. The use thereof as a heater is not limited, and methods for known metal heaters, carbon heaters, etc., can be used. For example, methods such as applying electric current directly to the porous material of the present invention, or using electric-field induction heating may be used to generate heat. The porous material of the invention can be suitably used as a heater for electromagnetic induction heating (especially as a heater for high-frequency induction heating). For example, when a spiral coil is provided on the outside of the porous material of the invention, and is operated at 1 to 100 kW and 10 to 500 kHz, the porous material generates heat effectively.

Since the porous body of the present invention has particularly excellent heat resistance and corrosion resistance, little deterioration thereof occurs in high-temperature superheated steam. It therefore can be used as a heater for steam heating. When using the porous material of the invention as a heater for steam heating, it is possible to produce hydrogen-containing gas efficiently. The porous material of the invention can thus be suitably used as a heater for producing a hydrogen-containing gas. Ordinary metal heaters and carbon heaters, when used in superheated steam, deteriorate at 600° C. or higher, and the resulting change of electrical resistance not only lessens their stability as heaters but also can make heating impossible. The heater according to the present invention is advantageous in that it hardly deteriorates in superheated steam of 800° C. or higher, and therefore can be used stably for a long time.

When the porous material of the invention is used as a heater for hydrogen-containing gas production, the heater may be, for example, heated preferably to 600° C. or higher and be brought into contact with steam to generate a gas that contains hydrogen produced by the decomposition of the steam. The underlying principle is unknown; however, it is considered that as well as being a heating element, the porous material, when brought into contact with steam, promotes decomposition into hydrogen and oxygen. It is further considered that the resulting oxygen undergoes chemical absorption by the intermetallic compound. The principal component of the obtained gas is hydrogen.

4. Effects of the Invention

In the porous material of the present invention, the intermetallic compound forms a three-dimensional network skeletal structure; therefore, despite being porous, the material has excellent properties in terms of corrosion resistance, chemical resistance, heat resistance, abrasion resistance, etc. The porous material of the invention is thus advantageous for various uses such as in heaters, catalyst supports, etc.

The production method according to the present invention provides the following effects:

(1) The intermetallic compound obtained by the production method of the present invention forms a porous body having a three-dimensional network structure. That is, the method provides an intermetallic compound with a unique structure that cannot be obtained by the prior art.

(2) The production method of the present invention can be completed in one step from the synthesis of the intermetallic compound itself to the formation of a porous material thereof.

(3) In the prior art, when an intermetallic compound is synthesized, external heating is generally needed. In contrast, according to the present invention, the chemical reaction heat generated at the time of a combustion synthesis reaction is effectively used, making external heating unnecessary except for ignition. In addition, since the reaction is completed in a short time, the present invention has excellent economic efficiency and productivity. The method of the present invention is thus extremely suitable for production on an industrial scale.

(4) According to the production method of the present invention, a high-temperature reaction at about 1500° C. or higher occurs at the time of combustion synthesis. This causes impurities in mixed powders to evaporate and be released from the system, thus giving a porous material of relatively high purity.

(5) The high-temperature reaction in the combustion synthesis melts part of the compound of an intermetallic compound porous material and fuses particles together, thus forming pores with a smooth surface, which increase contact area for gases or liquids. The porous material of the invention is therefore suitable for a heater that has excellent heat transfer, for example.

(6) Generally, the production of multilayer porous intermetallic compounds requires multiple steps. For example, a surface treatment is performed after a single-phase intermetallic compound is produced; sintering is performed after a multilayer molded mixed powder composed of an oxide layer and an intermetallic compound layer is produced; etc. In contrast, the present invention makes it possible to produce an intermetallic compound porous material (multilayer intermetallic compound porous material) in one step, with all or part of its surface being composed of oxide, and its interior being composed of intermetallic compound. Since the synthesis of an intermetallic compound to multilayering can be completed in one step, the present invention has excellent economic efficiency and productivity.

BEST MODE FOR CARRYING OUT THE INVENTION

The present invention is described in further detail with reference to the following examples. However, the invention is not limited to these examples.

EXAMPLE 1

A mixture of iridium powder and aluminum powder in a molar ratio of 1:1 was subjected to press molding to form a cylindrical molded mixed powder with a diameter of 50 mm and a height of 100 mm. The upper end of the molded mixed powder placed on a graphite board was ignited in air by electric discharge, and a high-temperature combustion wave (about 2100° C.) propagated, completing the combustion synthesis reaction in about 10 seconds. As a result, a porous body with a relative density of 50% was obtained. It was confirmed by electron microscope that this porous body had a three-dimensional network structure as shown in FIG. 1. X-ray powder diffraction analysis showed that the surface layer of the porous body was mainly composed of aluminum oxide and also contained an iridium aluminum intermetallic compound, and that the interior of the porous body was mainly composed of an iridium aluminum intermetallic compound. It was further confirmed that the bottom layer of the porous body was composed of the same iridium aluminum intermetallic compound as in the interior, since the bottom layer, which was in contact with the graphite board, was isolated from the air.

EXAMPLE 2

A mixture of nickel powder and aluminum powder in a molar ratio of 1:1 was charged into a metal mold and was subjected to press molding to form a bar-like rectangular molded mixed powder with a length of 100 mm, each base side being 15 mm. One end of the molded mixed powder was ignited in air by a YAG laser, and a combustion wave propagated, completing the combustion synthesis reaction in about 5 seconds. As a result, a porous body with a relative density of 45% was obtained in almost the same shape as the molded mixed powder without cracking, warping, etc. X-ray powder diffraction analysis showed that the surface layer of the porous body was mainly composed of aluminum oxide and also contained a slight amount of nickel aluminum intermetallic compound, and that the interior of the porous body was mainly composed of a nickel aluminum intermetallic compound.

EXAMPLE 3

A mixture of nickel powder and aluminum powder in a molar ratio of 1:1 was charged into a metal mold and was subjected to press molding to form a pellet with a diameter of 20 mm and a thickness of 5 to 20 mm. One end of the pellet was ignited in argon by a YAG laser, and a combustion wave propagated, completing the combustion synthesis reaction in about 5 seconds. As a result, a porous body with a relative density of 45% was obtained. X-ray powder diffraction analysis showed that the porous body was mainly composed of a nickel aluminum intermetallic compound, which was indicated as NiAl.

EXAMPLE 4

A mixture of nickel powder and aluminum powder in a molar ratio of 0.7:0.3 was subjected to press molding to form a cylindrical molded mixed powder with a diameter of 20 mm and a height of 100 mm. One end of the molded mixed powder was ignited in air by a YAG laser, and a combustion wave propagated, completing the combustion synthesis reaction in about 10 seconds. As a result, a porous body with a relative density of 50% was obtained in almost the same shape as the molded mixed powder without cracking, deformation, etc. X-ray powder diffraction analysis showed that the surface layer of the porous body was mainly composed of aluminum oxide and also contained a slight amount of nickel aluminum intermetallic compound, and that the interior of the porous body was mainly composed of nickel aluminum intermetallic compounds including NiAl and $Ni_3Al$.

EXAMPLE 5

A mixture of cobalt powder and aluminum powder in a molar ratio of 1:0.9 was charged into a metal mold and was subjected to press molding to form a bar-like rectangular molded mixed powder with a length of 100 mm, each base side being 15 mm. One end of the molded mixed powder was ignited in air by a YAG laser, and a combustion wave propagated, completing the combustion synthesis reaction in about 5 seconds. As a result, a porous body with a relative density of 45% was obtained in almost the same shape as the molded mixed powder without cracking, warping, etc. X-ray powder diffraction analysis showed that the surface layer of the porous body was mainly composed of aluminum oxide and also contained a cobalt aluminum intermetallic compound, and that the interior of the porous body was mainly composed of a cobalt aluminum intermetallic compound.

EXAMPLE 6

To a mixture of nickel powder and aluminum powder in a molar ratio of 1:1 was added 1% to 10% by weight of Cu powder. The resulting mixed powder was charged into a metal mold and was subjected to press molding to form a cylindrical molded mixed powder with a diameter of 20 mm and a height of 25 mm. The molded mixed powder was then subjected to combustion synthesis under the same conditions as in Example 1. As a result, a Cu-containing intermetallic compound porous body with a relative density of 45% was obtained. An element distribution analysis of the interior layer of the porous body showed that Cu fine powder was uniformly distributed on the surface of the nickel aluminum skeleton forming a three-dimensional network structure. It is clear that if the mixed powder contains Ag powder or Sn powder in place of Cu powder, the resulting intermetallic compound porous bodies should have their respective metal powders distributed in a similar manner.

EXAMPLE 7

A mixture of nickel powder and aluminum powder in a molar ratio of 1:1 was charged into a metal mold and was subjected to press molding to form a bar-like rectangular molded mixed powder with a length of 100 mm, each base side being 15 mm. One end of the molded mixed powder was ignited in argon by a YAG laser, and a combustion wave propagated, completing the combustion synthesis reaction in about 8 seconds. As a result, a porous body with a relative density of 50% was obtained in almost the same shape as the molded mixed powder without cracking, warping, etc. X-ray powder diffraction analysis showed that the porous body was composed of a nickel aluminum intermetallic compound.

EXAMPLE 8

Electrodes were fixed to both ends of the bar-like intermetallic compound porous body obtained in Example 2, through which electric current was passed. As a result, the porous body generated heat, and its temperature rose to 1300° C.

EXAMPLE 9

A spiral coil was provided on the outside of the intermetallic compound porous pellet obtained in Example 3, and high-frequency induction heating was carried out at 1 kW and about 200 kHz. As a result, the porous body generated heat, and its temperature rose to 1500° C.

EXAMPLE 10

As shown in FIG. 2, intermetallic compound porous pellets obtained in Example 3 were charged into a quartz tube, and a spiral coil was provided on the outside of the quartz tube. High-frequency induction heating was carried out at 5 kW and frequencies at about 20 kHz, about 200 kHz, and about 400 kHz. As a result, the porous body generated heat, and its temperature rose to 1500° C. at each frequency.

EXAMPLE 11

Saturated steam (100° C.) was introduced into the equipment of Example 10 through the lower inlet of the quartz tube. The steam was heated when passing through gaps between the heated intermetallic compound porous pellets, and high-temperature superheated steam of 1000° C. or higher was obtained from the upper outlet of the quartz tube. After cooling this high-temperature superheated steam, a component analysis was performed of the remaining gas. As a result, at least 10 vol % of $O_2$ gas and at least 50 vol % of $H_2$ gas were identified.

EXAMPLE 12

Two bar-like rectangular intermetallic compound porous bodies obtained in Example 2 were placed in an aqueous solution containing ions of heavy metals such as Cr and Mn. Direct-current voltage was then applied to these porous bodies, and heavy metals deposited on the intermetallic compound porous body at the negative electrode side. It is thus clear that when the conductive intermetallic compound porous body is used as an electrode, it allows the electrolytic deposition of heavy metals.

Figure 1:
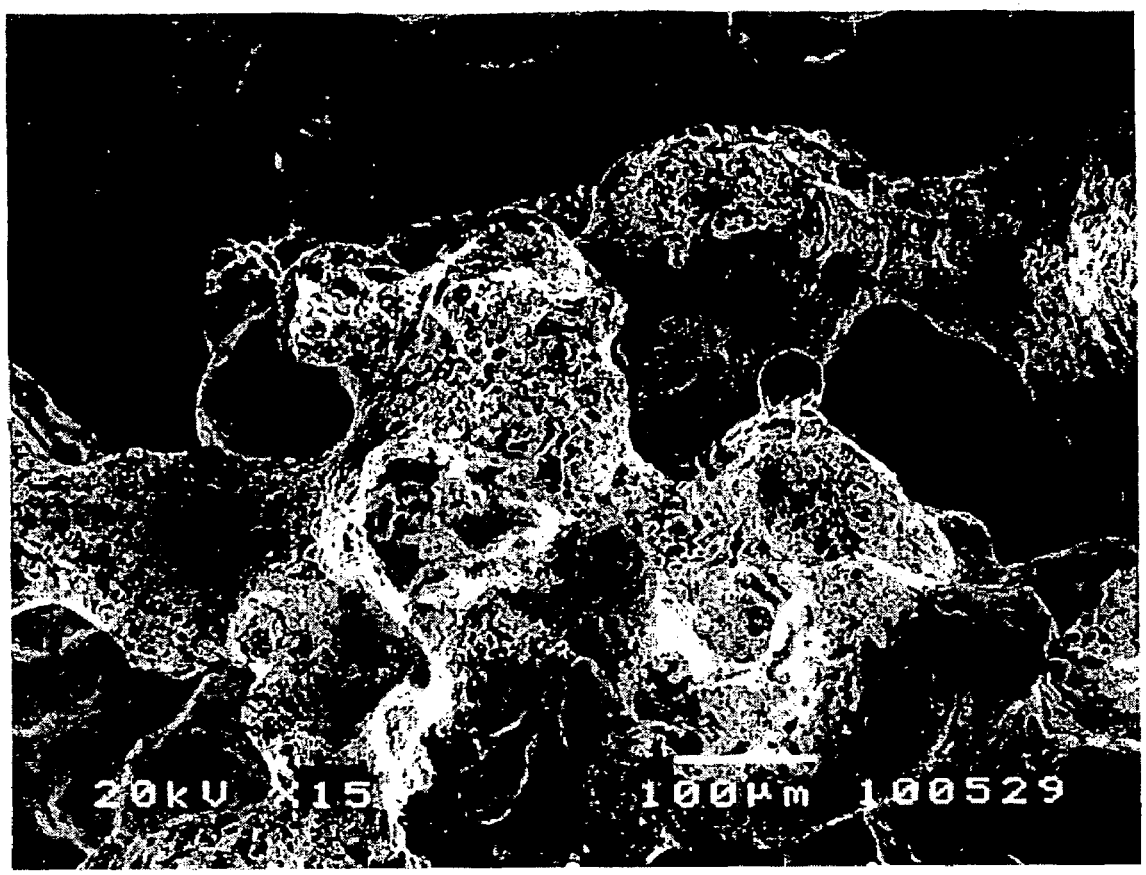
FIG. 1 shows the internal structure of the porous body obtained in Example 1.
Figure 2:
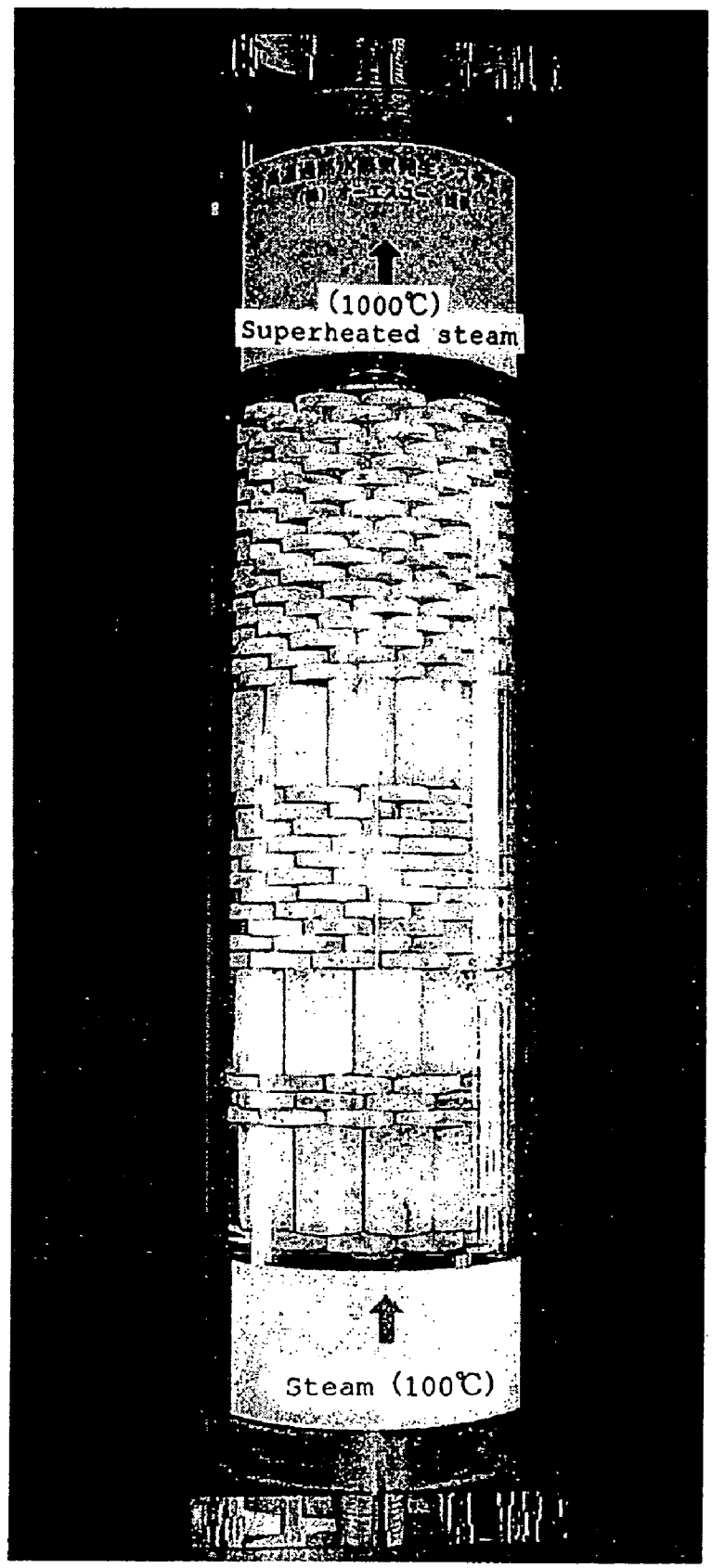
FIG. 2 shows an outside view of intermetallic compound porous pellets charged into the quartz tube of Example 10.

The invention claimed is:

1. A method for producing a porous material, comprising molding a mixed powder that comprises at least two inorganic powders and performing a combustion synthesis reaction in air on the resulting molded mixed powder; wherein
    (1) the porous material comprises an intermetallic compound,
    (2) the intermetallic compound has a three-dimensional network skeletal structure,
    (3) the porous material has a relative density of not more than about 80%, and
    (4) the mixed powder comprises an aluminum powder in combination with an inorganic powder comprising at least one member selected from the group consisting of iron, cobalt, nickel, ruthenium, rhodium, palladium, osmium, iridium, and platinum.

2. A production method according to claim 1, wherein the mixed powder further comprises a powder comprising at least one member selected from the group consisting of metals, intermetallic compounds, and ceramics with the exception of the above inorganic powder and aluminum powder.

3. A production method according to claim 1, wherein before the combustion synthesis reaction, the surface of the molded mixed powder is provided with at least one member selected from the group consisting of metals, intermetallic compounds, and ceramics.

* * * * *